United States Patent [19]

Yajima

[11] Patent Number: 4,627,511
[45] Date of Patent: Dec. 9, 1986

[54] OPTICAL TRACKING ROBOT SYSTEM

[75] Inventor: Hiroshi Yajima, Tokyo, Japan

[73] Assignee: Casio Computer Co., Ltd., Tokyo, Japan

[21] Appl. No.: 785,162

[22] Filed: Oct. 7, 1985

[30] Foreign Application Priority Data

Oct. 18, 1984 [JP] Japan .................. 59-217237

[51] Int. Cl.$^4$ ............................................. B62D 1/00
[52] U.S. Cl. .................................. 180/167; 250/491.1
[58] Field of Search .................. 180/167, 168, 169; 901/1, 47; 250/203 R, 491.1; 318/587; 364/424

[56] References Cited

U.S. PATENT DOCUMENTS

| | | | |
|---|---|---|---|
| 3,011,580 | 12/1961 | Reid | 180/169 |
| 3,749,197 | 7/1973 | Deutsch | 180/169 |
| 3,987,297 | 10/1976 | Brienza et al. | 250/203 R |
| 4,119,900 | 10/1978 | Kremnitz | 318/587 |
| 4,373,161 | 2/1983 | Matsumura | 180/167 |

OTHER PUBLICATIONS

"A Semi-Autonomous Remote Controlled Mobile Robot by Marie et al.

Primary Examiner—John J. Love
Assistant Examiner—Richard M. Camby
Attorney, Agent, or Firm—Frishauf, Holtz, Goodman & Woodward

[57] ABSTRACT

In an optical tracking robot system, a target has a light emitting section with a high light emitting directivity, for emitting a light beam modulated into pulses. A tracking robot has a tracking sensor section for monitoring a light beam by a pair of light receiving elements, for processing signals from the received light beam, and for generating and supplying drive control signals to a travel control section. In response to drive control signals the travel control section generates and supplies drive signals to a driver section. The driver section drives the tracking robot so that the robot advances while turning to the right when the output level of the right side light receiving element is higher than that of the left side light receiving element, and to the left when the latter is higher than the former. The robot also has an approach sensor section which detects the light beam by means of a light receiving element, and generates and supplies stop control signals to the travel control section. The travel control section supplies stop signals to the driver section, thereby stopping the robot.

10 Claims, 11 Drawing Figures

F I G. 5
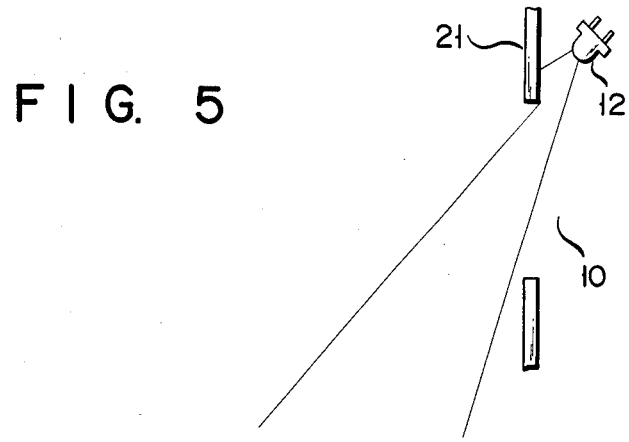
F I G. 6
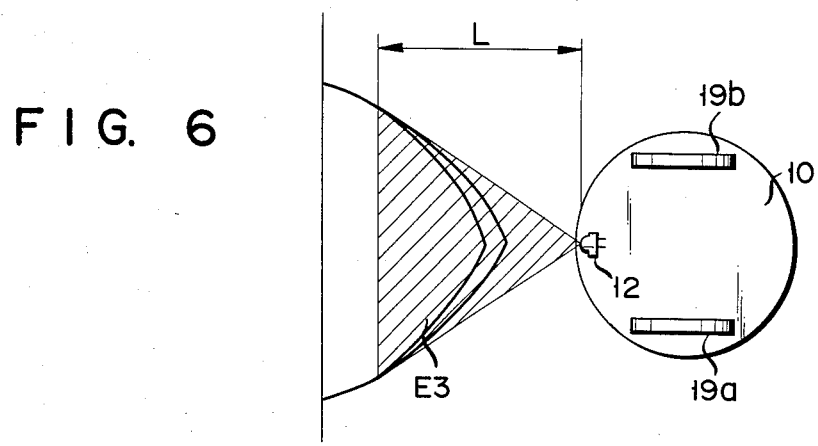
F I G. 7
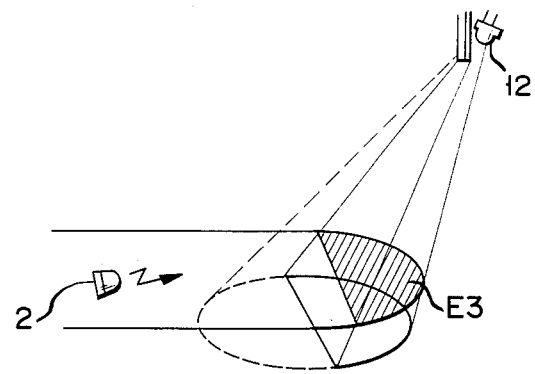

F I G. 8A
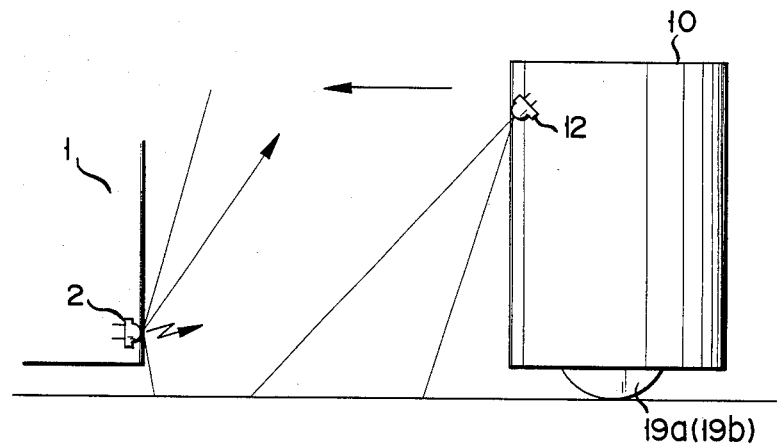
F I G. 8B
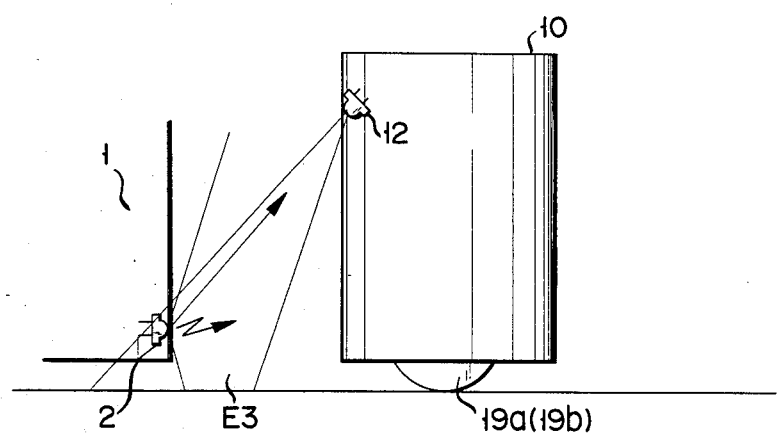

OPTICAL TRACKING ROBOT SYSTEM

BACKGROUND OF THE INVENTION

The present invention relates to an optical tracking robot system for sensing and pursuing a light beam emitted from a target.

A wide variety of robots have recently been developed and put to practical use. Among them are mobile robots of an electromagnetic induction type, optical type and capacitance type which travel in predetermined paths. Each of these robots cannot cover the whole floor space. A mobile robot is known which has a visual recognition system, ultrasonic oscillation system, or feeler system and can thus travel anywhere on the floor. The visual recognition system and ultrasonic oscillation system are sophisticated and very expensive. The feeler system, which detects a target or obstacle when touching or running against it and then stops at the target or moves away from the obstacles, cannot be controlled in an uncontacted manner.

SUMMARY OF THE INVENTION

The present invention is contrived in consideration of these circumstances, and is intended to provide an optical tracking robot system in which a robot pursues a target by sensing a light beam from a light emitting device attached to the target, and can approach the target and can stop before striking against the target and in which the robot can be automatically stopped at any distance from the target.

In order to achieve the above object, an optical tracking robot system according to the present invention comprises a light emitting means attached to a target, a tracking sensor means for monitoring a light beam emitted from the light emitting means and for generating drive control signals to determine the direction of drive of a tracking robot, an approach sensor means for monitoring the light beam emitted from the light emitting means and for generating a stop control signal to stop the robot approaching the target, a travel control means for receiving the drive control signals from the tracking sensor means and the stop control signal from the approach sensor means to generate drive signals and stop signals, and a driver means for driving the tracking robot in response to the drive signals from the travel control means and stopping the robot in response to the stop signals.

In the robot system of the invention, the target has a light emitting means having fully extensive light emitting directivity, and the tracking robot has the tracking sensor means for tracking the target and the approach sensor means for detecting approach to the target. Hence, a target tracking operation can be controlled. Thus, the robot can track the specific target, and can stop when it gets within a predetermined distance from the target, to avoid running against the target. This predetermined distance can be changed to any other value.

BRIEF DESCRIPTION OF THE DRAWINGS

FIG. 5 shows an arrangement of the infrared receiving element for approach detection;

FIG. 6 shows an approach detection area of the infrared receiving element for approach detection attached to the tracking robot;

FIG. 7 is a perspective view corresponding to FIG. 6, showing the approach detection area of the infrared receiving element for approach detection; and FIGS. 8A and 8B show an operation performed when the tracking robot approaches a target.

DETAILED DESCRIPTION OF THE PREFERRED EMBODIMENT

An embodiment of the present invention will now be described in detail with reference to drawings. In this embodiment, an infrared emitting element and an infrared receiving element are used as a light emitting element and a light receiving element, respectively. However, the use of any other types of light emitting and receiving elements may be made and result in the same.

Figure 1:
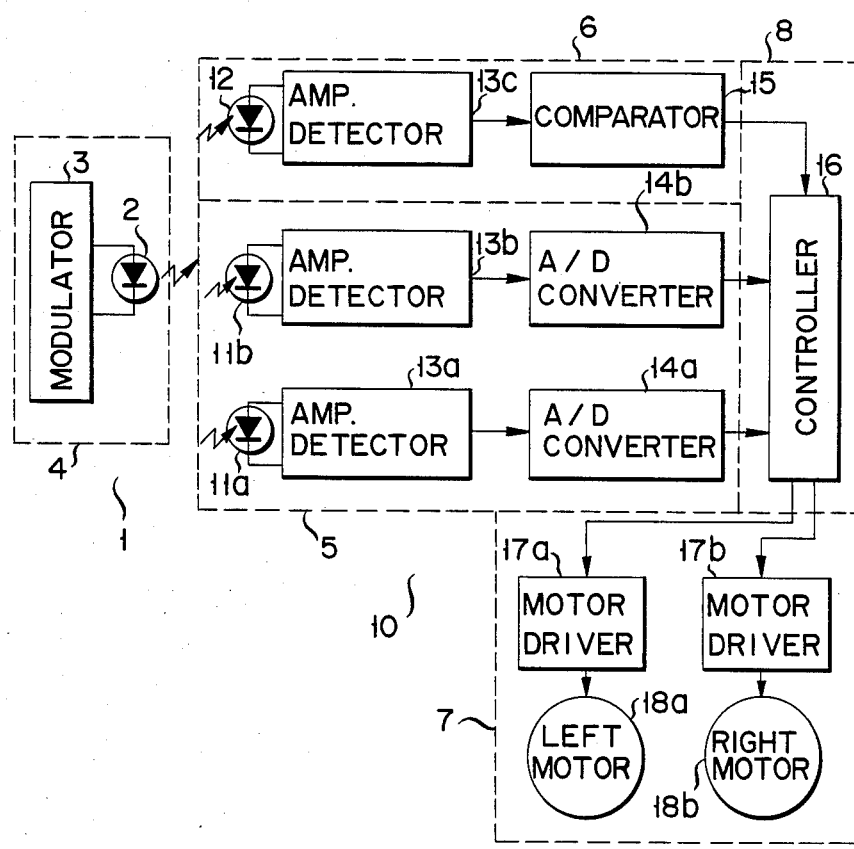
FIG. 1 shows a circuit block diagram of the optical tracking robot system according to an embodiment of the present invention.

Referring now to FIG. 1, a configuration of the embodiment of the invention will be described.

As shown in FIG. 1, target 1 has light emitting section 4 built-in. Light emitting section 4 includes at least one infrared emitting element (hereinafter referred to as emitting element) 2 and modulator 3 for controlling the operating voltage of emitting element 2. On the other hand, self-propelled tracking robot 10 comprises tracking sensor section 5, approach sensor section 6, travel control section 8, and driver section 7. Tracking sensor section 5 includes infrared receiving elements 11a and 11b for tracking, amplifier detectors 13a and 13b each having a built-in band-pass filter, and A/D converters 14a and 14b. Approach sensor section 6 includes infrared receiving element 12 for approach detection, amplifier detector 13c having a built-in band-pass filter, and comparator 15. Control section 8 is formed of a controller 16. Driver section 7 includes motor drivers 17a and 17b, motors 18a and 18b, pair of wheels 19a and 19b, and casters (not shown). Amplifier detectors 13a, 13b and 13c receive output signals from receiving elements 11a, 11b and 12, and supply output signals to A/D converters 14a and 14b and comparator 15 respectively. Receiving the output signals from amplifier detectors 13a and 13b A/D converters 14a and 14b supply drive control signals to controller 16 respectively. In response to the output signal from the amplifier detector 13c, comparator 15 sends a stop control signal to controller 16. In response to the input control signals, controller 16 sends drive or stop signals to motor drivers 17a and 17b, thereby controlling the drive of left and right motors 18a and 18b. Wheels 19a and 19b are driven by motors 18a and 18b, respectively.

Operations of the optical tracking robot system according to the present invention will now be described in detail.

Figure 2:
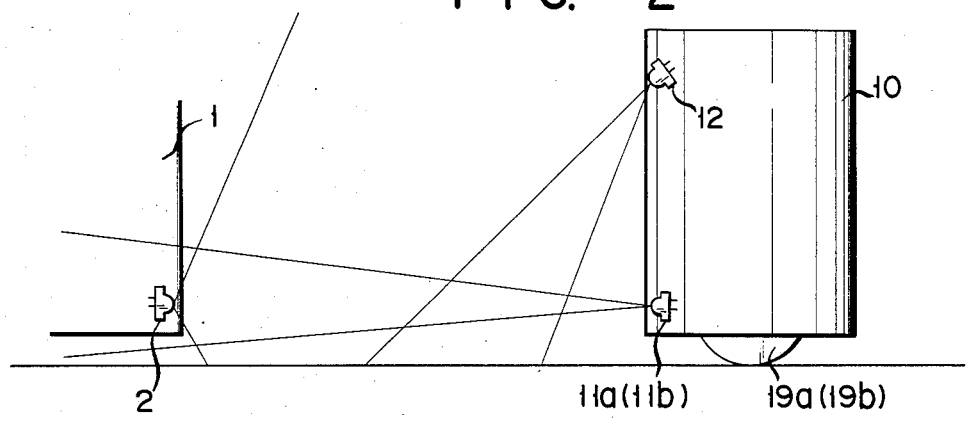
FIG. 2 shows the arrangement of an infrared emitting element, infrared receiving elements for tracking, and infrared receiving element for approach detection in the optical tracking robot system of the invention.
Figure 3:
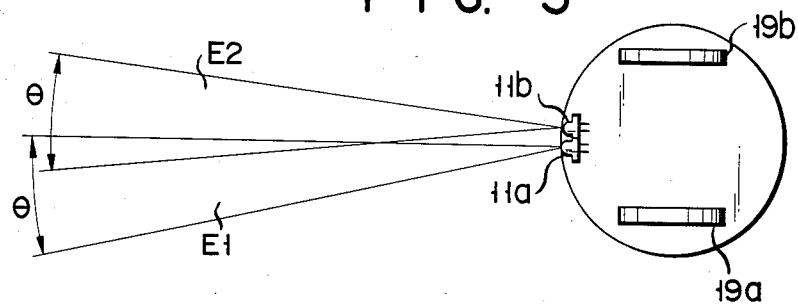
FIG. 3 shows light receiving areas of the infrared receiving elements for tracking attached to a tracking robot.
Figure 4A:
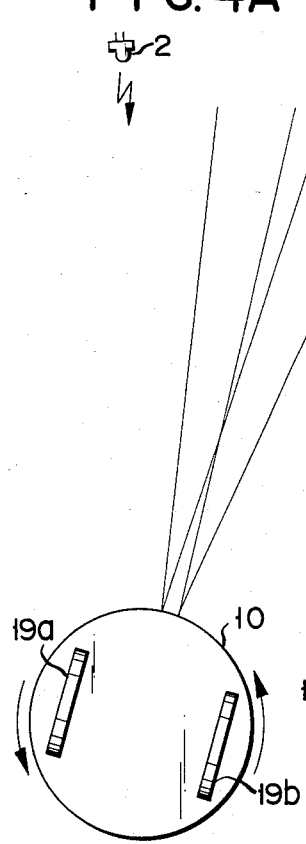
FIGS. 4A, 4B and 4C illustrate a target tracking action of the infrared tracking robot.
Figure 4B:
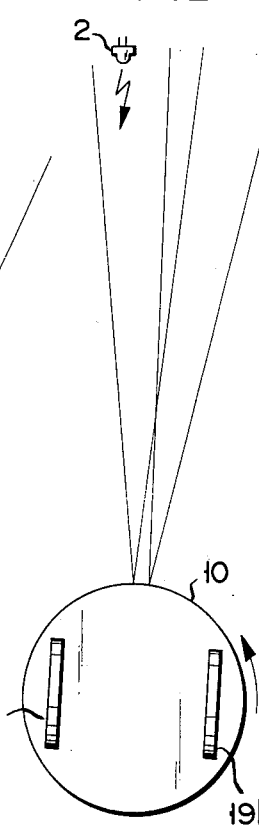
Figure 4C:
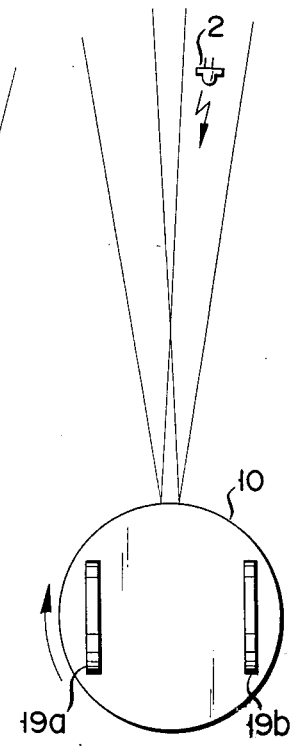

A tracking operation will be explained first. Emitting element 2 attached to target 1 has fully extensive light emission directivity, as shown in FIG. 2, and the applied voltage to emitting element 2 is modulated into pulses by modulator 3. Thus, emitting element 2 emits an infrared ray modulated into pulses toward tracking robot 10. On the other hand, receiving elements 11a and 11b in tracking robot 10 have acute light receiving directivity, as shown in FIG. 3, and are arranged so that their light receiving areas overlap each other. If receiving elements 11a and 11b cannot detect the infrared ray, control section 8 supplies the drive signals to motor drivers 17a and 17b so that the body of tracking robot 10 is turned, as shown in FIG. 4A, to the position in which the light receiving elements 11a and 11b can detect the infrared ray emitted from emitting element 2. If receiving elements 11a and 11b detect the infrared ray from emitting element 2, they supply the receiving signals to amplifier detectors 13a and 13b, respectively. Amplifier detectors 13a and 13b amplify the input signals, demodulate them by means of their built-in band-pass filters, take out the specified signals, and supply them to A/D converters 14a and 14b, respectively. A/D converters 14a and 14b convert the input signals into four-bit digital signals according to the level of the input signals, and sends the converted signals to controller 16. In response to the output signals from A/D converters 14a and 14b, controller 16 controls the drive of motor drivers 17a and 17b. Thus, if the output level of left-side receiving element 11a is higher than that of right-side receiving element 11b, tracking robot 10 advances while turning to the left, as shown in FIG. 4B. If the output level of right-side receiving element 11b is higher than that of left-side light receiving element 11a, on the other hand, tracking robot 10 advances while turning to the right, as shown in FIG. 4C. Tracking robot 10 repeats operation described above to control motors 18a and 18b so that the output levels of receiving elements 11a and 11b become equal, thereby approaching the target 1.

A stopping operation of the tracking robot will now be explained. As shown in FIG. 2, light receiving element 12 for approach detection is provided at the upper front portion of tracking robot 10 so as to have diagonally downward light receiving directivity. As shown in FIG. 5, shade or adjustable aperture 21 is disposed in front of receiving element 12, restricting the light receiving area or target approach detection area E3 of receiving element 12, as shown in FIG. 6. With use of shade or aperture 21, an approach detection distance L may be determined optionally. Thus, approach detection area E3 or approach detection distance L can freely be set with ease by only adjusting the vertical position of shade or aperture 21, as shown in FIG. 7. When tracking robot 10 approaches target 1 to be within approach detection distance L therefrom, as shown in FIGS. 8A and 8B, receiving element 12 monitors the infrared ray emitted from target 1. Amplifier detector 13c receives the outputs from receiving element 12, amplifies them, and demodulates them by means of its built-in band-pass filter, extracts the specified signals, and supplies them to comparator 15. Comparator 15 converts the input signals into a 1-bit digital signal indicative of light reception or nonreception, and supplies the converted signal to controller 16. In response to the input signal, controller 16 sends the stop signals to motor drivers 17a and 17b to stop motors 18a and 18b, thereby stopping tracking robot 10. Thus, when tracking robot 10 tracks and approaches target 1 to get within approach detection distance L therefrom, as shown in FIGS. 8A and 8B, receiving element 12 receives the infrared ray emitted from target 1, so that tracking robot 10 stops. Thereafter, when target 1 moves so that emitting element 2 gets out of approach detection area E3, receiving element 12 is disabled from receiving the infrared ray from target 1. Thereupon, tracking robot 10 resumes the above-mentioned tracking operation.

In the optical tracking robot system of the present invention, as described above, a target is provided with light emitting means having fully extensive light emitting directivity, while a tracking robot is fitted with tracking sensor means and approach sensor means for detecting approach to the target. The output of the light emitting means is modulated into pulses, and the light receiving signal is demodulated within the tracking robot. Thus, the tracking robot can judiciously track the specific target, and can be stopped to avoid running against the target when it gets within a predetermined range of distance from the target.

What is claimed is:

1. An optical tracking robot system comprising:

light emitting means attached to a target, said light emitting means including a source of operating voltage; at least one light emitting element coupled to said operating voltage source for emitting a light beam modulated into pulses; and modulator means for modulating the operating voltage of said light emitting element impulses;

tracking sensor means for monitoring the light beam emitted from said light emitting means and including means for generating drive control signals to determine the drive direction of a tracking robot;

approach sensor means including a light receiving element provided at a front portion of the tracking robot at a different height from said light emitting element, for detecting an approach to the target; aperture means provided in front of said light receiving element for restricting the light receiving area of said light receiving element such that an approach detection distance from the target can be adjusted to a desired value; an amplifier detector means including means for amplifying pulse signals received by said light receiving element, means coupled to said amplifying means for demodulating the amplified signals by means of a band-pass filter, and output means coupled to said demodulating means for generating an output signal; and comparator means for comparing the level of the output signal generated by said output means of said amplifier detector means with a predetermined threshold level and generating stop control signals to stop the tracking robot based on the result of said comparison when the tracking robot approaches the target;

travel control means for receiving said drive control signals from said tracking sensor means and said stop control signals from said approach sensor means and for generating drive signals and stop signals; and driver means for driving the tracking robot in response to said drive signals from said travel control means and for stopping the robot in response to said stop signals from said travel control means.

2. The optical tracking robot system of claim 1, wherein said tracking sensor means comprises:

a pair of light receiving elements provided at the front of the tracking robot, said pair of light receiving elements having receiving areas which are arranged to receive light from respective different directions, the light receiving areas of said pair of light receiving elements overlapping each other, said pair of light receiving elements receiving said light beam emitted by said light emitting means;

a pair of amplifier-detector means coupled to respective ones of said pair of light receiving elements, each of said amplifier-detector means including means for amplifying a pulse signal received by its associated light receiving element, means including a band-pass filter for detecting and demodulating the amplified signal, and means for outputting a signal corresponding to said detected and demodulated signal; and a pair of A/D convertor means coupled to respective ones of said amplifier-detector means for converting the output signals from its associated amplifier-detector means into said drive control signal, said drive control signals being supplied to said travel control means.

3. The optical tracking robot system of claim 2, wherein said drive control signals are digital signals, each comprising a plurality of bits.

4. The optical tracking robot system of claim 3, wherein said stop control signals are one-bit digital signals.

5. The optical tracking robot system of claim 1, wherein said stop control signals are one-bit digital signals.

6. The optical tracking robot system of claim 1, wherein said aperture means comprises an adjustable aperture means.

7. The optical tracking robot system of claim 1, wherein said light receiving element of said approach sensor means has a diagonally downward light receiving directivity.

8. The optical tracking robot system of claim 2, wherein said pair of light receiving elements of said tracking sensor means are provided at the front portion of the tracking robot and are horizontally spaced from each other, the light receiving areas of said pair of light receiving elements including said overlapping area and including horizontally spaced non-overlapping areas, said overlapping areas being located between said non-overlapping areas.

9. The optical tracking robot system of claim 8, wherein said drive control signals determine the left and right drive direction of said tracking robot.

10. The optical tracking robot system of claim 1, wherein said drive control signals determine the left and right drive direction of said tracking robot.

* * * * *